US009295265B2

(12) United States Patent
Peters et al.

(10) Patent No.: US 9,295,265 B2
(45) Date of Patent: Mar. 29, 2016

(54) DEVICE AND METHOD FOR PROCESSING CARCASS PARTS OF SLAUGHTERED POULTRY

(71) Applicant: MAREL STORK POULTRY PROCESSING B.V., Boxmeer (NL)

(72) Inventors: Erik Hendrikus Werner Peters, Boxmeer (NL); Maurice Eduardus Theodorus van Esbroeck, Bemmel (NL); Timotheus Johannes Wester, Venray (NL); Jan Willem Bos, Haps (NL)

(73) Assignee: Marel Stork Poultry Processing B.V (NL)

( * ) Notice: Subject to any disclaimer, the term of this patent is extended or adjusted under 35 U.S.C. 154(b) by 0 days.

(21) Appl. No.: 14/441,341

(22) PCT Filed: Nov. 5, 2013

(86) PCT No.: PCT/NL2013/050791
§ 371 (c)(1),
(2) Date: May 7, 2015

(87) PCT Pub. No.: WO2014/073957
PCT Pub. Date: May 15, 2014

(65) Prior Publication Data
US 2015/0272140 A1 Oct. 1, 2015

(30) Foreign Application Priority Data

Nov. 9, 2012 (NL) .................................. 2009782

(51) Int. Cl.
*A22C 21/00* (2006.01)
(52) U.S. Cl.
CPC ......... *A22C 21/0023* (2013.01); *A22C 21/0053* (2013.01)

(58) Field of Classification Search
CPC .. A22C 21/00; A22C 21/0023; A22C 21/003; A22C 21/0053; A22C 21/0069; A22C 21/0076; A22C 21/0084
USPC .................. 452/149–156, 163–167, 177–179
See application file for complete search history.

(56) References Cited

U.S. PATENT DOCUMENTS

| 5,188,560 | A | * | 2/1993 | Hazenbroek | ....... | A22C 21/0023 |
| | | | | | | 452/167 |
| 5,407,383 | A | * | 4/1995 | Diesing | .............. | A22C 21/0023 |
| | | | | | | 452/165 |

(Continued)

OTHER PUBLICATIONS

International Patent Application No. PCT/NL2013/050791, International Search Report, mailed Jan. 27, 2014, 4 pages.

(Continued)

*Primary Examiner* — Richard Price, Jr.
(74) *Attorney, Agent, or Firm* — Kilpatrick Townsend & Stockton LLP

(57) ABSTRACT

The present invention relates to a device and method for removing wing tips (2t) from carcass parts of slaughtered poultry, comprising a wing tip processing station (100) with a wing tip cutter (105) adapted to remove the wing tip segment from the lower wing member, and a set of multiple wing guides (101, 102) for guiding and positioning one wing so as to define the position of the lower wing member, the wing tip joint and the wing tip of said one wing at the wing tip cutter. At least one upper wing member guide (101) and at least one lower wing member guide (102) is provided. According to the present invention, the lower wing member guide comprises two guide members defining a slit (104) between them in which the lower wing member is received, wherein at least one of the guide members is biased towards the other, allowing for variations of the width of the slit, such that—at the wing tip cutter—the guide members clampingly engage the lower wing member with the radius and ulna bones being positioned one behind the other, seen in the conveying direction, thereby defining the orientation of the lower wing member and of the wing tip segment at the wing tip cutter.

15 Claims, 11 Drawing Sheets

(56) References Cited

U.S. PATENT DOCUMENTS

| | | | |
|---|---|---|---|
| 5,618,230 A | 4/1997 | Bargele et al. | |
| 6,007,416 A * | 12/1999 | Janssen | A22C 21/003 452/135 |
| 6,277,020 B1 * | 8/2001 | Stephens | A22C 21/0023 452/135 |
| 6,929,541 B2 * | 8/2005 | Cervantes | A22C 21/00 452/149 |
| 6,935,942 B1 * | 8/2005 | Evers | A22C 21/003 452/150 |
| 6,986,707 B2 * | 1/2006 | Van Den Nieuwelaar | A22C 21/0023 452/187 |
| 7,335,095 B2 * | 2/2008 | Sekiguchi | A22C 21/0023 452/169 |
| 7,341,505 B1 * | 3/2008 | Gasbarro | A22C 21/0023 452/169 |
| 8,517,805 B1 * | 8/2013 | Ray | A22C 21/0023 452/169 |
| 8,591,298 B1 * | 11/2013 | Watson | A22C 21/0084 452/135 |

OTHER PUBLICATIONS

Netherlands Patent Application No. 2009782, Search Report dated Jul. 17, 2013 and English version of Written Opinion, 8 pages.
International Patent Application No. PCT/NL2013/050791, International Search Report and Written Opinion, mailed Jan. 27, 2014, 9 pages.

\* cited by examiner

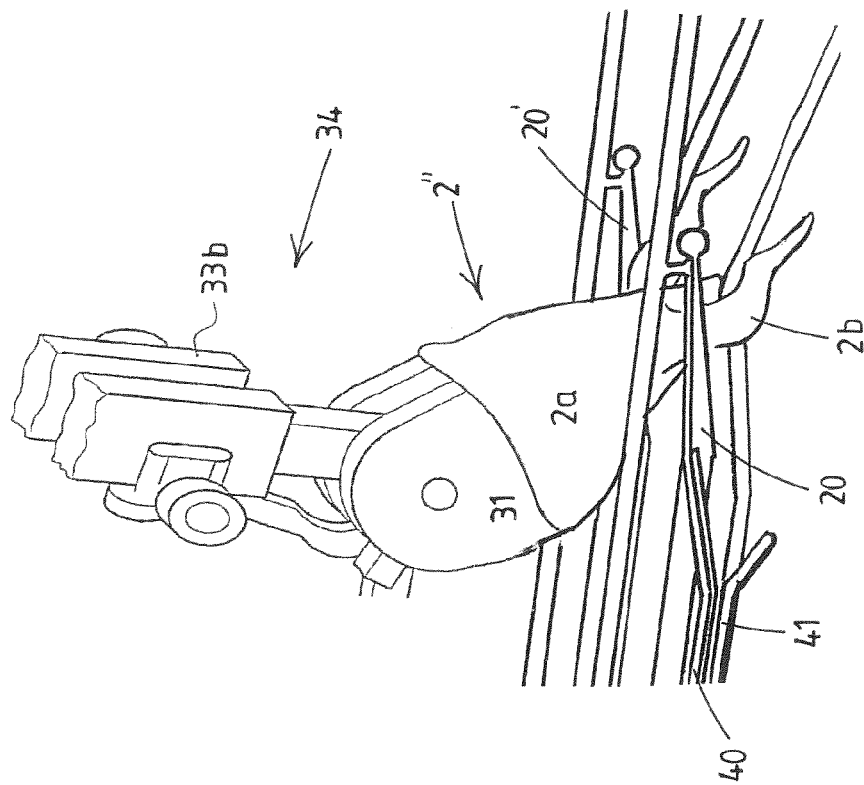
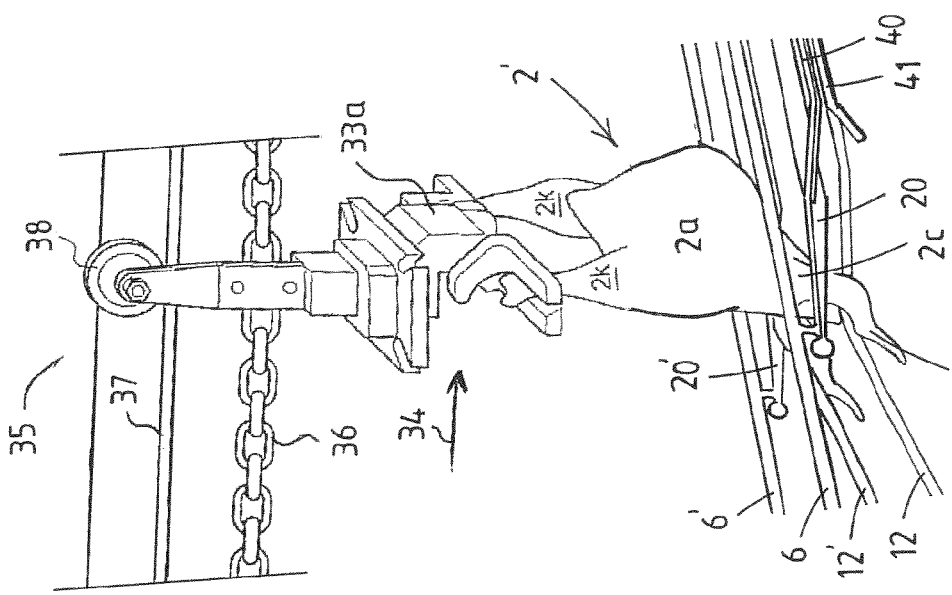
Fig.3b
Fig.3a

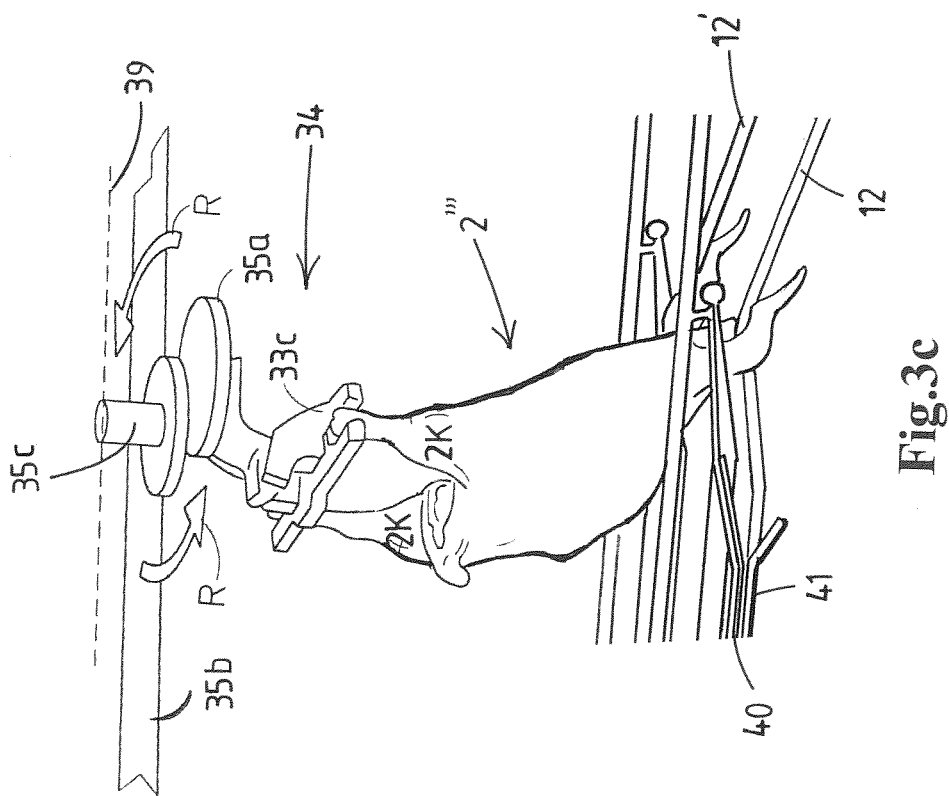

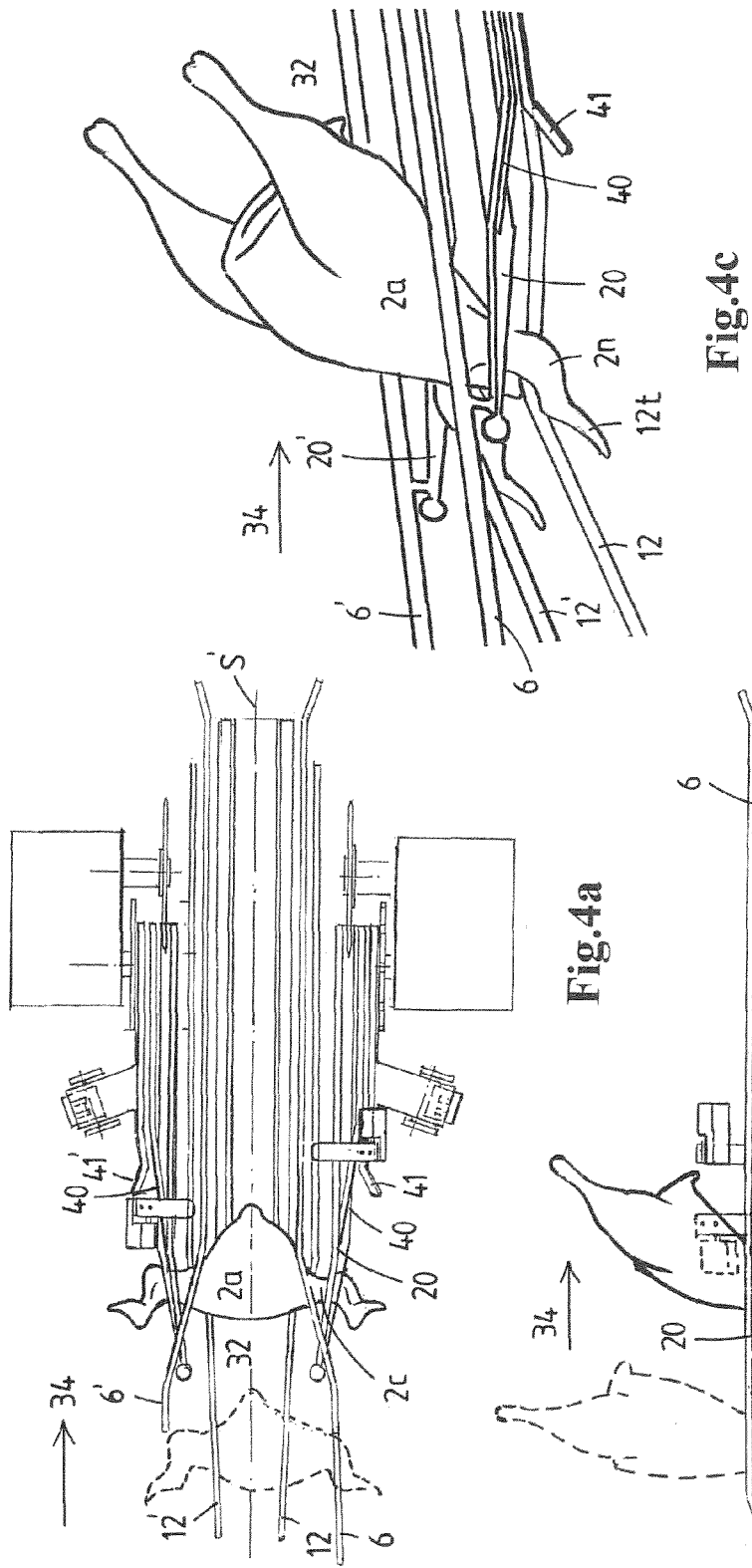

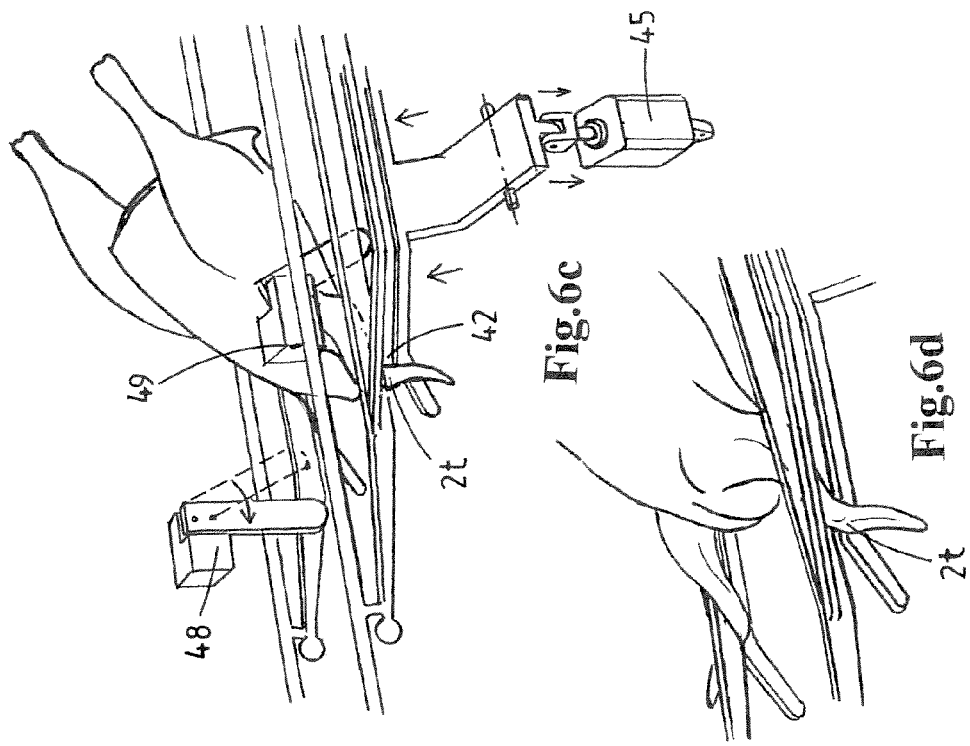
Fig.6c
Fig.6d
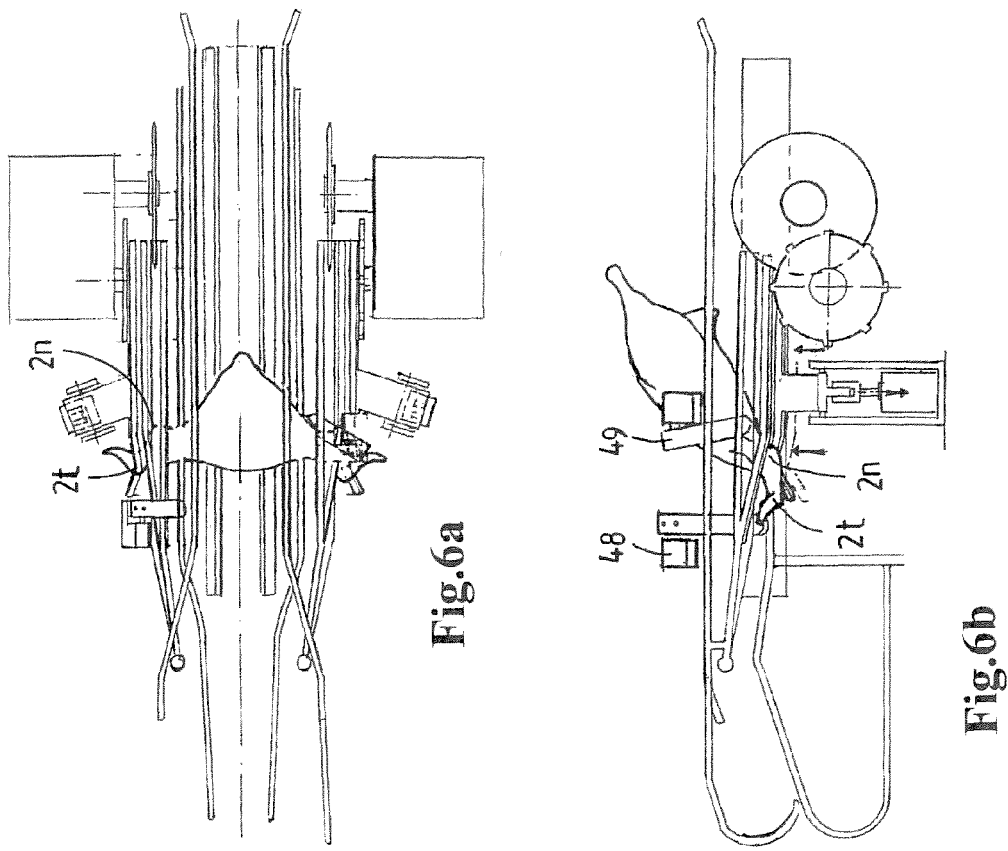
Fig.6a
Fig.6b

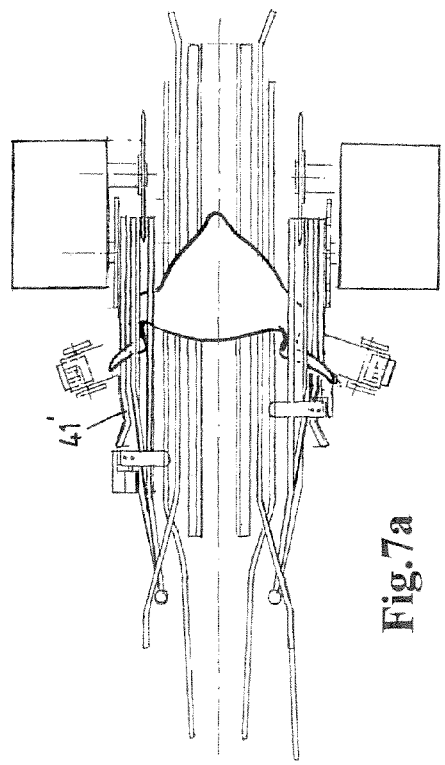
Fig.7a
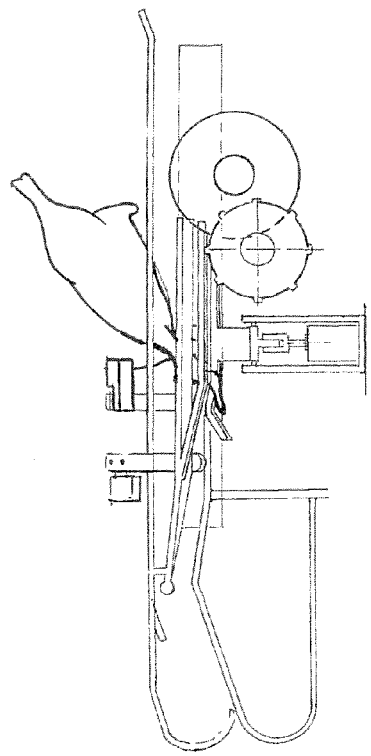
Fig.7b
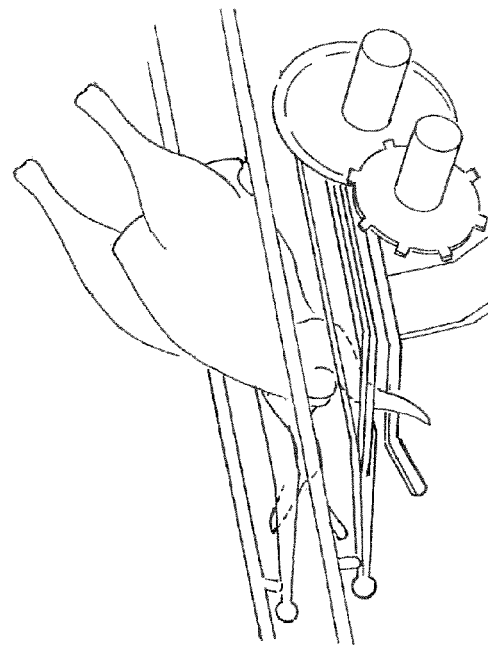
Fig.7c
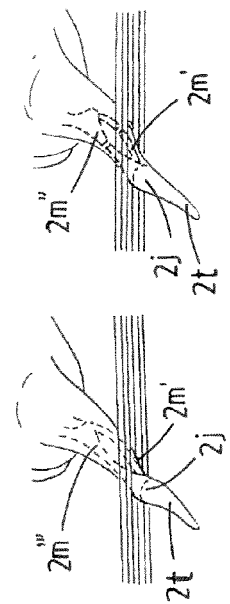
Fig.7d
Fig.7e

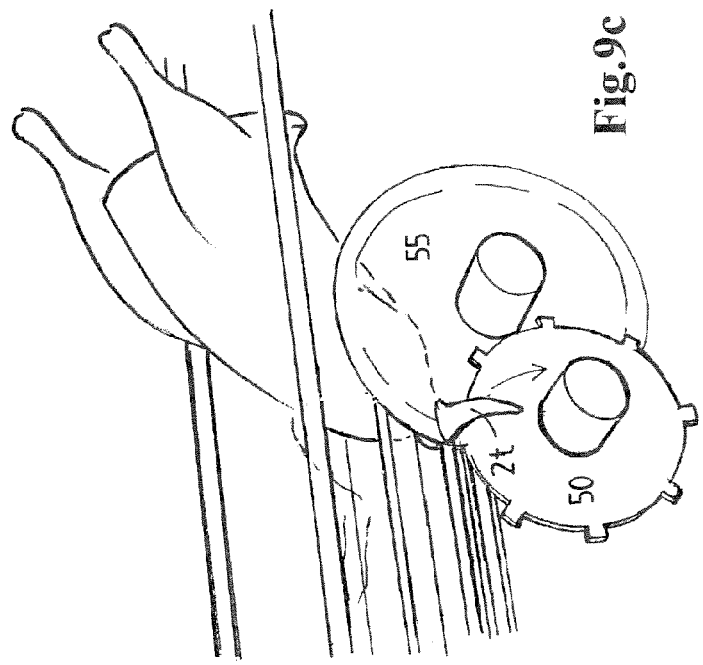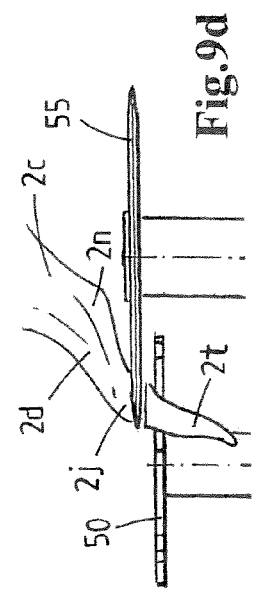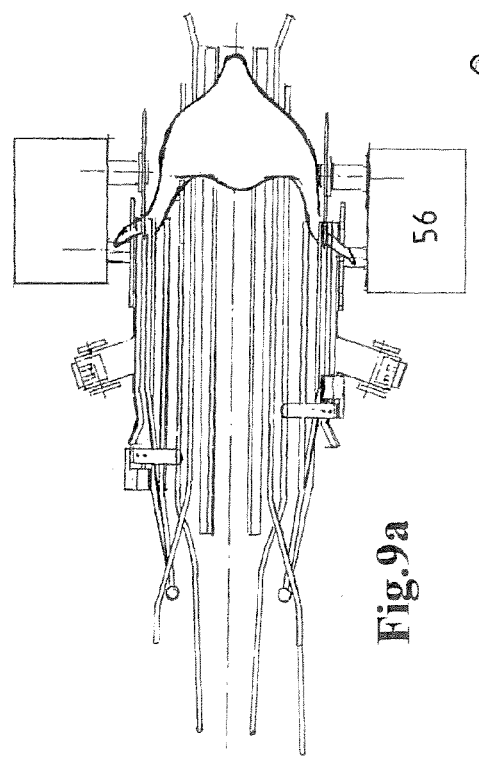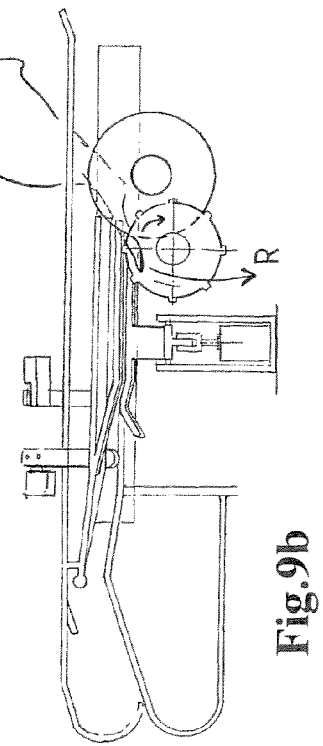

DEVICE AND METHOD FOR PROCESSING CARCASS PARTS OF SLAUGHTERED POULTRY

CROSS-REFERENCE TO RELATED APPLICATIONS

This patent application is the U.S. national phase of International Application No. PCT/NL2013/050791, filed on Nov. 5, 2013 and published in English on May 15, 2014 as International Publication No. WO 2014/073957 A1, which application claims priority to Netherlands Patent Application No. 2009782, filed on Nov. 9, 2012, the contents of all of which are incorporated herein by reference.

FIELD

The present invention relates to a device and a method for processing carcass parts of slaughtered poultry, wherein the wing tip segment is removed from the lower wing member.

BACKGROUND

Removing wing tips is common practice, as the wing tips are not always wanted for consumption and may form an interference for further processing of the wings. It is important that the wing tips are removed accurately, because improper cuts may cause bone fragments to be lodged in the meat of the wings. Automation of this process is desired to keep up with the growing consumer demand for poultry wings, especially chicken wings.

Such a method and apparatus for severing wing tip segments is known e.g. from U.S. Pat. No. 5,188,560. The apparatus comprises guide rails to convey and guide a carcass. Guide surfaces and rods are provided for engaging and guiding the shoulders, upper and lower wing members, to position the wing tip segments to engage the wing tip rotary brush discs. The aim of the present invention is to provide an improved device and method for automatic removal of wing tip segments.

SUMMARY

This aim is achieved according to the invention in that the lower wing member guide comprises two guide members defining a slit between them in which the lower wing member is received, wherein at least one of the guide members is biased towards the other, allowing for variations of the width of the slit, such that—at the wing tip cutter—the guide members clampingly engage the lower wing member with the radius and ulna bones being positioned one behind the other, seen in the conveying direction, thereby defining the orientation of the lower wing member and of the wing tip segment at the wing tip cutter.

As such, not only the position of the lower wing member and wing tip is known, but also the orientation is accurately defined. An advantage is that the removal of the wing tip may be performed more accurate. Another advantage is that the device is also suitable for handling broken wings, (partly) damaged wings, and products with (partly) missing wings, dislocated wings, etc. etc. By clampingly engaging the radius and ulna bones, these bones are splinted by the guide members of the lower wing member guide, and thus a subsequent cutting operation will be easier.

The clamping engagement of the lower wing member, during conveyance of the carcass part of slaughtered poultry, imparts a resistance in the movement of the lower wing member, thus forcing the lower wing member, and in particular the radius and ulna bones of the lower wing member, in a defined orientation in which the radius and ulna bones are positioned behind one another, seen in the direction of conveyance.

To achieve such a splinted situation, it is preferred that the guide members of the lower wing member guide clampingly engage the lower wing member with the radius and ulna bones being positioned one behind the other, seen in the conveying direction, close to the wing tip joint. Thus, it is conceivable that the lower wing member guide primarily engages the lower wing member close to the elbow joint, and that the situation in which the radius and ulna bones are positioned one behind another is arrived when the lower wing member guide has moved along the lower wing member and is close to the wing tip joint. If, alternatively, the clamping engagement with the radius and ulna bones being positioned one behind the other, seen in the conveying direction, would be accomplished at the elbow side of the lower member, the splinting effect may be nullified by a broken bone at a more distal end of the wing.

According to the invention, at least one of the guide members of the lower wing member guide is biased towards the other, allowing variations of the width of the slit. It is conceivable that only one guide member is biased, or that both are biased. As a result of the bias, a clamping engagement of the lower wing member is achieved. This clamping engagement should be strong enough to position the radius and ulna bones one behind the other, seen in the conveying direction, to define the orientation of the lower wing member. Hence, the bias should prevent 'free' movement of the radius and ulna bones. On the other hand, the clamping engagement should not cause bone breaking, and hence, should not be excessively strong. Such a 'tuned' clamping engagement is achieved by biasing at least one of the guide members.

According to the invention, the lower wing member guide comprises two guide members defining a slit. In a preferred embodiment, the guide members are formed by elongated rails, preferably rounded rails, for smoothly guiding the lower wing member.

Biasing at least one of the guide members of the lower wing member guide can be achieved for example by providing a resilient guide member, or by resiliently supporting a stiff guide member. For example, a guide member is movably supported, e.g. e.g. by a hydraulic or pneumatic device, a spring arrangement or the like. The bias is thus achieved by oil pressure, air pressure or spring pressure or the like, respectively.

In a preferred embodiment, an actuator is provided to adjust the bias of the guide member being biased towards the other. As such, the bias can be adjusted, e.g. depending on the dimensions of the poultry that is being processed.

In a particular advantageous embodiment, the actuator allows an additional movement of the guide member being biased towards the other, between an open entry position and an engagement position, wherein in the open entry position the lower wing member is allowed to enter the slit between the guide members, and wherein in the engagement position the guide members clampingly engage the lower wing member. Hence, upon entry the lower wing member is fully opened, e.g. allowing the elbow joint to pass the lower wing member guide. Subsequently, the guide members of the lower wing member are allowed to move to the engagement position, in which the lower wing member is engaged.

The carcass parts of slaughtered poultry which are subject to the device and method according to the invention comprise at least part of a rib cage having a breast side and a back side, also called torso, and one or both wings. The body with the rib cage is preferably eviscerated, defeathered and deheaded. Preferably, the legs are still present. This is in particular advantageous when a carrier is embodied to support carcass parts suspended from the legs. Poultry that is commonly processed according to the invention is chicken and turkey.

A wing comprises and upper wing member, a lower wing member and a wing tip segment. All parts comprise bones and meat that is naturally present thereon. In particular, the upper wing member comprises the humerus bone, the lower wing member comprises the radius and ulna bones, and the wing tip segment comprises wing tip bones. The wing is connected to the body via the shoulder joint, and further an elbow joint is present between the upper and lower wing member, and a wing tip joint is present between the lower wing member and the wing tip segment. (This is shown in more detail in the anatomical drawing of FIGS. 1a and 1b). It is noted that the wings may be broken wings, (partly) damaged wings, or wings with parts missing, e.g. with a partial wing tip.

The device according to the invention comprises a conveyor comprising a conveyor path and at least one carrier which is adapted to carry a carcass part, along which conveyor path the at least one carrier can be displaced in a conveying direction. The conveyor is used to feed a carcass part to the wing tip processing station, and in the wing tip processing station the carcass part is processed while the carcass part is carried by the carrier.

The at least one carrier is preferably adapted to carry a carcass part in a hanging orientation. For example, the carriers may be designed as leg suspension carriers, in which the legs of the poultry are suspended, and the body and the at least one wing is suspended from legs. The wings will hang down from the body. Alternatively, carriers are known that carry carcass parts in an upright orientation, such as carriers that carry the body on a cone-shaped body-carrier.

The poultry can be conveyed with its back or breast facing forwards. According to the invention, it is preferred that the poultry is conveyed with the back side leading.

According to the present invention, wing guides are provided to catch and guide the wings. For these wing guides, it is favorable, but not a prerequisite, that the carcass parts are conveyed in a hanging orientation.

The device according to the invention comprises a wing tip processing station, disposed along the conveyor path. The carcass part is fed to the wing tip processing station by the conveyor. It is conceivable that the station is provided adjacent the conveyor path, or provided across (over) the conveyor path and the conveyor. The wing tip processing station can be one of multiple processing stations, all provided along the conveyor path. For example, a wing cutter for removal of the upper and lower wing members from the body of the slaughtered poultry can be provided downstream of the wing tip processing station.

In the wing tip processing station the carcass part is processed while the carcass part is being carried by the carrier. In particular, the wing tip segment is removed from the lower wing member, while the upper and lower wing members are still attached to the body. This is advantageous, e.g. for further processing of the poultry, as the carcass part is still carried by the carrier and can be conveyed to other processing stations.

Preferably, the wing tip segment is removed from the lower wing member by providing a cut in the wing tip joint, between the wing tip bones and the radius and ulna bones. It is noted that in the wing tip joint a number of very small bones embedded in cartilage (connective tissue). The cut is made in this mass of small bones, and it is experienced that hardly any bone fragments are lodged in the meat of the wings, especially when positioning the wing tip joint with a device or method according to the present invention. It is noted that is very much preferred that the cut is made in the wing tip joint, and not through the radius and ulna bones, as these bones are known to easily generate bone fragments in the meat. The cut can be made parallel to the direction of conveyance, either from above or from below. Preferably, the cut is made substantially perpendicular to the direction of conveyance.

The wing tip processing station according to the present invention comprises a wing tip cutter for removing the wing tip segment from the lower wing member. In view of the desired accuracy, the wing tip cutter preferably comprises a slim and sharp knife, to prevent bone fragments to be lodged in the meat of the wings. The wing tip cutter possibly comprises a rotary circular cutting blade. Alternatively, a reciprocating elongated knife blade is also conceivable.

Possibly, the wing tip processing station comprises a support device for supporting the wing tip segment in the vicinity of the wing tip cutter, opposite the side of the wing tip cutter where the lower wing member is engaged by the lower wing member guide. The guide members of the lower wing member guide support the lower wing member, at one side of the wing tip cutter. Supporting the wing tip at the other side of the wing tip cutter will cause a firm support of the wing from which the wing tip segment is to be removed, which will contribute to the accuracy of the cut made by the wing tip cutter. The support device is e.g. embodied as a rotatable support wheel, provided upstream of and adjacent the wing tip cutter. The rotatable guide wheel is preferably provided with multiple indentations for receiving a wing tip segment. Alternatively, the support device may also be embodied as an elongated guide rail. Thus, the lower wing member is guided by the lower wing member guide, and once it is close to the wing tip cutter, the support device receives and supports the wing tip segment. Thus, the wing tip joint is accurately presented to the wing tip cutter, and supported while being cut.

Preferably, the wing tip processing station is also provided with a wing tip segment receptacle, for receiving the wing tip segments being cut off by the wing tip cutter, and possibly for subsequent guidance for collection or transport.

The device according to the invention comprises a set of multiple wing guides for guiding and positioning one wing so as to define the position of the lower wing member, the wing tip joint and the wing tip at the wing tip cutter. Hence, the set of wing guides is provided to position the wing tip segment, in order to accurately remove this wing tip segment. In particular, the wing tip cutter provides a cut in the wing tip joint, and thus the guides accurately position the wing tip joint.

Preferably, wing guides are arranged symmetrical aside the conveyance path, to guide both wings of the poultry simultaneously, and to remove the wing tips simultaneously. Alternatively, it is conceivable that the wings are processed subsequently.

Wing guides are commonly known, and generally comprise elongated rods, rails, plates, etc. etc. In addition, frequently also body guides are provided for guiding the body of the slaughtered poultry, e.g. in the flank of the body, between the shoulder and the hip. Two guides may define a slit for receiving a (part of a) wing. The wing guides are generally provided parallel to the conveying path and extend in the conveying direction. Upstream, the wing guides comprise an entry location for catching and/or receiving the wing. Downstream, an exit location for the wing may be provided.

According to the invention, at least one upper wing member guide and at least one lower wing member guide are provided. The upper wing member guide catches and guides the upper wing member at least between an upstream upper wing member entry location and the wing tip cutter. Preferably, the upper wing member enters the upper wing member guide adjacent the shoulder joint. Alternatively, any other portion of the upper wing member may enter the upper wing member guide.

Possibly, the upper wing is guided in a slit, defined by at least one upper wing member guide. It is conceivable that the slit is further defined by a body guide, e.g. extending along the torso. It is also conceivable that the upper wing is not guided in a slit, but for example by a single upper wing guide.

Possibly, the upper wing member guide extends along the conveyor path from the upper wing member entry location, via the wing tip cutter to a further downstream location. Thus, it is conceivable that the upper wing member guide continues to guide the upper wing member beyond the wing tip cutter, e.g. for further processing of the wing.

In a preferred embodiment, a portion of the upper wing member guide between the upper wing member entry location and an elbow defining position is provided at an angle with the conveyor path such that the upper wing member guide flares outwards with respect to the conveyor path seen in the direction of conveyance, as a result of which during conveyance of the carcass the upper wing member is folded away from the body.

Preferably, the upper wing member is engaged at the upper wing member entry location at the shoulder side of the upper wing member. During conveyance, the upper wing member is engaged from the shoulder side, in the direction of the distal elbow side of the upper wing member. At the elbow defining position the upper wing member guide engages the upper wing member adjacent the elbow joint of the poultry, thereby defining the position of the elbow joint.

This is particularly advantageous when the lower wing member entry location is provided in the vicinity of this elbow defining position, adjacent the upper wing member guide. As such, the location of the lower wing member is more precisely known, and it is for example possible to engage the lower wing member closely adjacent the elbow joint.

According to the invention, at least one lower wing member guide is provided which catches and guides the lower wing member at least between a lower wing member entry location and the wing tip cutter, wherein the lower wing member entry location is downstream of the upper wing member entry location.

According to a preferred embodiment of the invention, a portion of the lower wing member guide between the lower wing member entry location and the wing tip cutter is provided at an angle with the conveyor path, such that the lower wing member guide flares outwards with respect to the conveyor path seen in the direction of conveyance. This may be in addition to an angled upper wing member guide, or provided solely. As a result of this angled lower wing member guide at the wing tip cutter—the guide members engage onto the lower wing member located close to the wing tip joint, opposite from the wing tip segment, thereby defining the position of the lower wing member and of the wing tip segment. Additionally, the lower wing member may be folded away from the upper wing member, during conveyance of the carcass.

Preferably, the lower wing member is engaged from the elbow side of the lower wing member towards the distal wing tip side of the lower wing member, during conveyance. Thus, at the wing tip processing station, the lower wing member guide engages the lower wing member adjacent the wing tip joint of the poultry, thereby defining the position of the lower wing member, the wing tip joint and the wing tip at the wing tip cutter.

In a possible embodiment according to the preamble of claim 1, the lower wing member guide comprises two guide members defining a slit between them in which the lower wing member is received, wherein a portion of the lower wing member guide between the lower wing member entry location and the wing tip cutter is provided at an angle with the conveyor path, such that the lower wing member guide flares outwards with respect to the conveyor path seen in the direction of conveyance; and wherein at least one of the guide members is biased towards the other, allowing for variations of the width of the slit, and causing a clamping engagement of the guide members onto the lower wing member, in particular the radius and ulna bones, such that—at the wing tip cutter—the guide members clampingly engage onto the lower wing member, with the radius and ulna bones being positioned one behind the other, seen in the conveying direction, and the guide members engaging onto the lower wing member located close to the wing tip joint, opposite from the wing tip segment, thereby defining the position and orientation of the lower wing member and of the wing tip segment.

The invention further relates to a method for removing wing tips of slaughtered poultry, in which a carcass part comprises at least part of a rib cage having a breast side and a back side, and at least one wing, the wing comprising:

an upper wing member with the humerus bone, extending between the shoulder and the elbow joint;

a lower wing member with the radius and ulna bones, extending between the elbow joint and the wing tip joint, a wing tip segment comprising wing tip bones, which is connected via the wing tip joint to the lower wing member, in which method use is made of a device according to claim 1, comprising the steps of:

conveying a carcass part in the conveying direction, preferably with its back side leading;

the upper wing member entering the upper wing member guide at the upper wing member entry location;

receiving the lower wing member in the slit defined by the two guide members of the lower wing member guide at the lower wing member entry location;

conveying the lower wing member along the angles lower wing member guides, thereby positioning the lower wing member;

biasing at least one of the guide members of the lower wing member guide causing a clamping engagement of the guide members onto the lower wing member, in particular the radius and ulna bones;

at the wing tip cutter—the guide members of the lower wing member guide clampingly engaging the lower wing member with the radius and ulna bones being positioned one behind the other, seen in the conveying direction, thereby defining the orientation of the lower wing member;

removing the wing tip segment from the lower wing member by the wing tip cutter.

The devices and method according to the invention will be explained in more detail below with reference to the appended drawing, which, without implying any restriction, shows exemplary embodiments.

BRIEF DESCRIPTION OF THE FIGURES

In the drawing:

FIGS. 3a-3c: show part of the wing tip processing station shown in FIG. 2, illustrating various carriers supplying a carcass;

FIGS. 4a-4c: show part of the wing tip processing station shown in FIG. 2, illustrating the entry of the upper wing member in plan view (FIG. 4a), side view (FIG. 4b) and perspective view (FIG. 4c);

FIGS. 6a-6d: show part of the wing tip processing station shown in FIG. 2, illustrating the activation of the actuator of a guide member of the lower wing member guide to an engagement position, in plan view (FIG. 6a), side view (FIG. 6b), perspective view (FIG. 6c), and a detailed perspective view (FIG. 6d);

FIGS. 7a-7e: show part of the wing tip processing station shown in FIG. 2, illustrating the clamping engagement of the lower wing member by the lower wing member guide, in plan view (FIG. 7a), side view (FIG. 7b), perspective view (FIG. 7c), and a detailed perspective view of the intact bones of the lower wing member (FIG. 7d), and a detailed perspective view of the broken bones of the lower wing member (FIG. 7e);

FIGS. 9a-9d: show part of the wing tip processing station shown in FIG. 2, illustrating the removal of the wing tip segment, in plan view (FIG. 9a), side view (FIG. 9b), perspective view (FIG. 9c), and a detailed plan view (FIG. 9d);

DETAILED DESCRIPTION

Figure 1B:
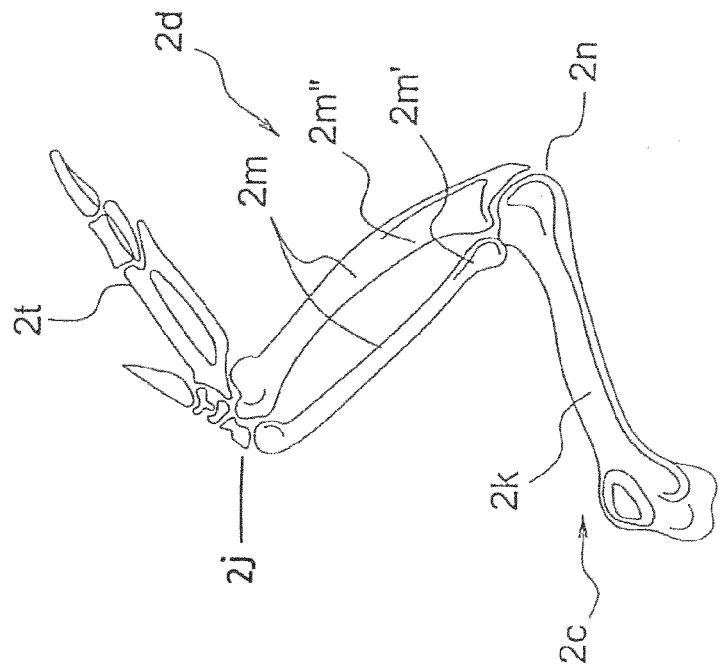
FIGS. 1a and 1b: diagrammatically depict the skeleton structure of poultry.
Figure 1A:
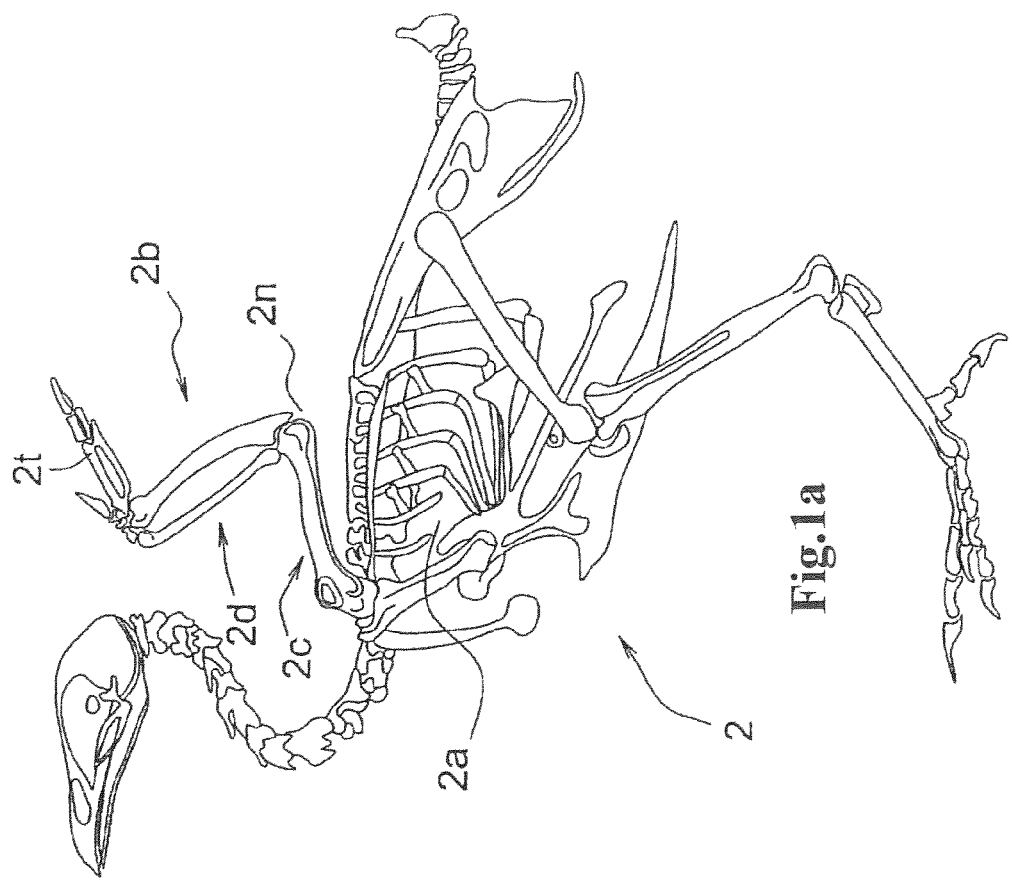

FIGS. 1a and 1b diagrammatically depict the skeleton structure of poultry, in particular of a chicken. The invention relates to a method and a device for processing carcass parts of slaughtered poultry. A carcass part 2 of the poultry comprises, for processing in accordance with the invention, at least part of a rib cage 2a and at least one wing 2b, comprising bone and meat that is naturally present. The meat which is naturally present around the bones is also not shown in FIG. 1. The wing 2b, shown in FIG. 1 of the slaughtered poultry on the carcass 2 comprises an upper member 2c including the humerus bone 2k, a lower member 2d including the radius bone 2m' and the ulna bone 2m" (jointly denoted by 2m) and an elbow 2n. At the other end of the lower member, which is not fixed to the elbow, there is a wing tip 2t which is fixed to the lower member via the wing tip joint 2j. According to the invention, the wing tip is removed when the radius 2m' and ulna bone 2m" are positioned one behind the other, seen in the conveying direction.

Figure 2:
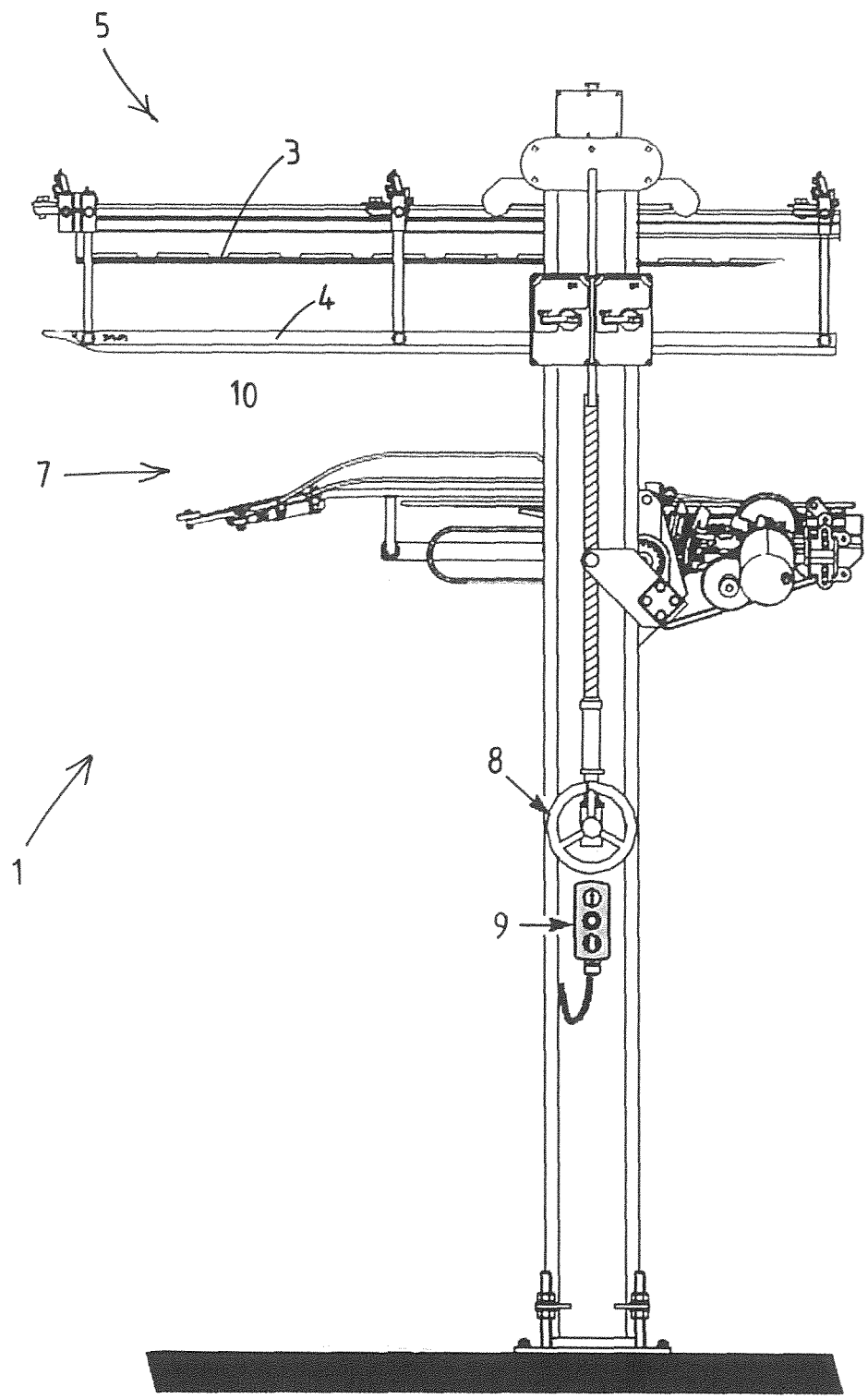
FIG. 2: shows an embodiment of a wing tip processing station according to the invention in its entirety.

FIG. 2 shows a first embodiment of a wing tip processing station 1 according to the invention in its entirety. In this figure, also a conveyor 5 is visible, having a rail 3 defining a conveyor path 10 along which at least one carrier, e.g. carrier 33a or 33b as visible in FIGS. 3a and 3b, can be displaced in a conveying direction 7. In particular, rail 3 may be similar to rail 37 of FIG. 3a, while rail 4 may be provided to prevent rotation of the carrier 33a. The conveyor 5 comprises operating means 8 and 9 for adjusting the relative position of the carriers and the wing tip processing station 1, to compensate for different poultry sizes. In addition, operating means (not visible) are provided to adjust the width of the processing station, to compensate for different poultry sizes, and to adjust the depth of the knives. The wing tip processing station 1 is disposed along the conveyor path 10. By way of example, the carcass parts shown in FIGS. 3a-3b can be fed in series to the said wing tip processing station 1 using a conveyor, examples of which are shown in FIGS. 3a and 3b. The wing tip processing station 1 is symmetrical in form, with the result that two wings on either side of the body can be processed in the same way. Details of the wing tip processing station shown in FIG. 2 are illustrated in FIGS. 3-9 below.

FIGS. 3a, 3b and 3c show the introduction section of the wing tip processing station 1, to which a carcass part 2 is being supplied. The section shown in FIGS. 3a-3c corresponds to the section shown in FIGS. 4a-4c, but specifically depicts the carcass part while being carried by a carrier, which is part of a conveyor. The introduction of the carcass part is being elaborated further with respect to FIG. 4. In the shown embodiment, the carcass part 2 (in FIG. 3a referred to with reference number 2', in FIG. 3b with reference number 2" and in FIG. 3c with 2''') is supplied with its back facing in a conveying direction 34. Although in practice it is greatly preferred for the back to be introduced first, this is not a required measure.

FIGS. 3a and 3c show a carcass part 2' and 2''' respectively, having a body, two wings 2b and two legs 2k. The legs 2k of the carcass part 2' are suspended in a carrier 33a and 33c, respectively. The carcass parts 2' and 2''' can be displaced with the carrier 33a and 33c in a conveying direction 34. The carcass parts 2' and 2''' are secured to the carriers 33a and 33c in such a manner that the fowl with the wings 2b are fed to the wing tip processing station 1 by the underside of the body. Carrier 33a forms part of a conveyor 35 which is driven with the aid of a chain 36. The conveyor 35 comprises a conveyor path, in this case the rail 37, along which the carriers 33 can be displaced in the conveying direction 34 via a wheel 38.

FIG. 3b shows another carcass part 2" which is secured to a carrier 33b. Carrier 33b forms part of a conveyor (not shown) with a conveyor path (not shown) along which the carriers 33b can be displaced in a conveying direction, denoted by arrow 34. The carcass 2" comprises only part of the body without legs and the two wings 2b, each having a lower member 2d and an upper member 2c. The carcass 2" is secured to a carrier part 31 which is adapted to project into the body which is open on one side. By way of example, the said carrier part is conical. It is preferable for it to be possible for the carrier part 31 to be oriented in one or more directions by associated orientation means. As a result, the fowl with the wings is fed to the wing tip processing station 1 by the underside of the body. The wing tip processing station 1 is disposed along the conveyor path (not shown).

The product carrier 33c in FIG. 3c is adapted to engage the two leg parts 2k of the carcass part 2'''. In this example, the carrier 33c has for each of the leg parts a receiving slot, optionally provided with a locking member in order to block the leg parts in said slots. The product carrier 33c is configured to convey the carcass part 1 along a track 39 in a direction of conveyance 34. The product carrier 33c is in this case attached to an overhead conveyor track 39 such as is generally known from the prior art in this field. Optionally, the product carrier 33c is rotatable about a vertical axis and/or rotatable about one or more other axes, indicated in FIG. 3c by the rotation arrows R. The rotation can be carried out by means of eccentric cams 35a which are attached between the product carrier 33c and the overhead conveyor track 39. The eccentric cams are operated by means of guides 35b which are arranged fixedly along the track. These guides enter into contact with the eccentric cams as the product carrier passes and bring the eccentric cams 35a gradually into the desired position. Connection part 35c is provided to connect the carrier 33c to a trolley, e.g. similar to the trolley shown in FIG. 3a.

The carriers 33a, 33b and 33c are only partly shown in FIGS. 3a and 3b but are generally known, for example from patents EP 0 577 821 and EP 1 191 852. The carcass part is carried by a carrier, such as for example the carriers 33a and 33b shown in FIGS. 3a and 3b, and fed to the wing tip processing station 1 with the aid of a conveyor, such as the device 35 shown in FIG. 3a or device 5 in FIG. 2. While the carcass part is being carried by a carrier, the carcass part is processed in the wing tip processing station 1.

In FIGS. 4-9, subsequent stages of a carcass part of slaughtered poultry being conveyed towards and into a wing tip processing station 1 according to the present invention are shown. In the drawings, the same situation is shown in various views: plan view, side view, perspective view and sometimes a detailed view. In the drawings, subsequent positions of the poultry along the conveyor path are shown. In short:

FIG. 4 illustrates the entry of the upper wing member;
FIG. 5 illustrates the activation of the actuator of a guide member of the lower wing member guide to an open entry position;
FIG. 6 illustrate the activation of the actuator of a guide member of the lower wing member guide to a closed engagement position;
FIG. 7 illustrate the clamping engagement of the lower wing member by the lower wing member guide;
FIG. 8 illustrate the support of the wing tip segment by a support device;
FIG. 9 illustrate the removal of the wing tip segment.

The introduction section of the wing tip processing station 1, shown in FIGS. 3 and 4, is provided with multiple wing guides and other guides arranged adjacent the conveyor path, at least upstream of the wing tip cutter for guiding and positioning the at least one wing so as to define the position of the lower wing member, the wing tip joint and the wing tip at the wing tip cutter. The direction of conveyance is indicated with arrow 34 both in FIGS. 3 and 4, but it is noted that FIGS. 3a and 3b are mirror images of FIG. 4c. It is noted that although not all body and wing guides may be visible in each view, they are all provided symmetrically at either side of the conveyor path 32, in particular symmetrically about axis S.

In the shown embodiment upper body guides 6 and 6' and lower body guides 12 and 12' are provided in addition to the wing guides to position the poultry body. The upper body guides 6 and 6' guide the body 2a on either side at the flange parts of the poultry, between the hip and the shoulder. As a result, the body 2a can pass through the wing tip processing station 1 in a straight line. The body guides 6, 6', 12, 12' are shaped in the form of a rod.

In this embodiment, upper wing member guides 20 and 20' and lower body guides 12 and 12' are provided to catch and guide the upper wing member at least between an upstream upper wing member entry location and the wing tip cutter. The upper wing member guides 20 and 20' comprise a ball-shaped end portion, facilitating the entry of the upper wing member to the upper wing member guide. Downstream, the upper wing member guides 20 and 20' comprises a plate-like portion, along which the upper wing member of the poultry is guided. The upper wing member is thus conveyed in the slit formed by upper wing member guides 20 and 20' and the body guides 12 and 12'.

In the plan view of FIG. 4a, it is visible that the mutual distance between upper wing member guide 20 and body guide 6 increases. In particular, a portion of the upper wing member guide 20, 20' between the upper wing member entry location (FIG. 4) and an elbow defining position (FIG. 5) is provided at an angle with the conveyor path 32, such that the upper wing member guides 20 and 20' flare outwards with respect to the conveyor path 32 seen in the direction of conveyance 34. As a result, during conveyance of the carcass, the upper wing member 2c is folded away from the body 2a. This is visible when comparing FIGS. 4a and 5a.

The shown upper wing member guide 20, 20' extends from the upper wing member entry location (FIG. 4), along the conveyor path 32, to the wing tip cutter 55 (FIG. 9). It is also conceivable that the upper wing member guide extends even further downstream.

In FIG. 5, the upper wing member 2c is at a position where the upper wing member 2c is fully folded away from the body part 2a, preferably without dislocating the upper wing member 2c from the shoulder joint. In this position, the position of the elbow 2n is accurately defined. The mutual positions of the upper wing member 20 and body guide 6 can preferably be adjusted, dependent on the general size of the poultry being processed. On the other hand, some degree of freedom is allowed as a small amount of overstretching of the upper wing member will not immediately result in dislocation. The most important effect of the angled upper wing member guides 20 and 20' is that the position of the elbow of each poultry wing is accurately defined.

This defined elbow position is provided in the vicinity of the lower wing member entry location, which is provided adjacent the upper wing member guide. Thus, the lower wing member entry location (FIG. 5) is downstream of the upper wing member entry location (FIG. 4).

According to the invention, the lower wing member guide comprises two guide members 40 and 41 (and analogously 40' and 41'), defining a slit 42 between them in which the lower wing member 2d is received. Guide member 40 of the lower wing member guide originates from the plate-like portion of upper wing member guide 20. The lower wing member guide extends from the lower wing member entry location (FIG. 5) to the wing tip cutter (FIG. 9). According to the invention the guide member 41 of the lower wing member guide can be biased towards the other guide member 40. The bias is thus in this embodiment achieved via an actuator 45, to allow variations of the width of the slit. The actuator may comprise a hydraulic or pneumatic device, a spring arrangement or the like, and be operated to adjust the bias of the guide member 41.

In the shown embodiment, the actuator 45 allows an additional movement of the guide member 41 being biased towards the other 40. In particular, the guide member 41 may be retracted to create an open entry position (FIG. 5) and an engagement position (FIG. 6), wherein in the open entry position (FIG. 5) the lower wing member 2d is allowed to enter the slit 42 between the guide members 40 and 41, and wherein in the engagement position (FIG. 6) the guide members 40 and 41 clampingly engage the lower wing member 2d.

Figure 5A:
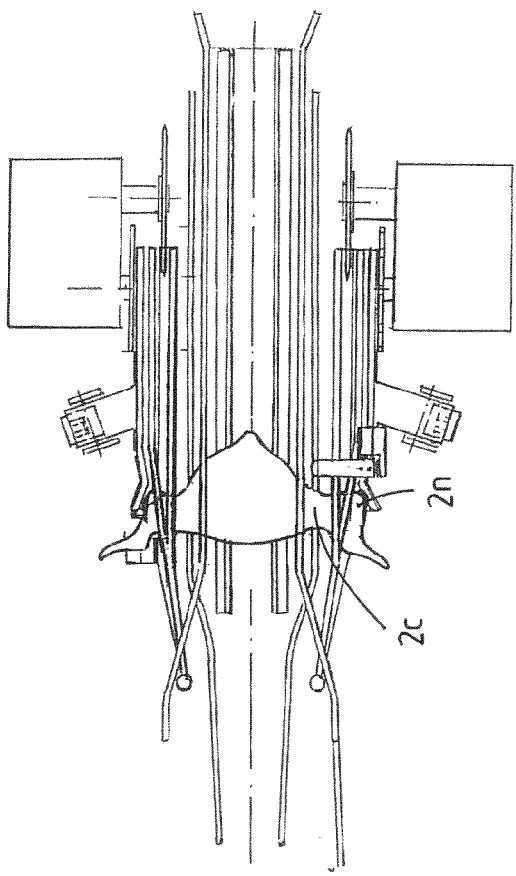
FIGS. 5a-5c: show part of the wing tip processing station shown in FIG. 2, illustrating the activation of the actuator of a guide member of the lower wing member guide to an open entry position, in plan view (FIG. 5a), side view (FIG. 5b) and perspective view (FIG. 5c)
Figure 5B:
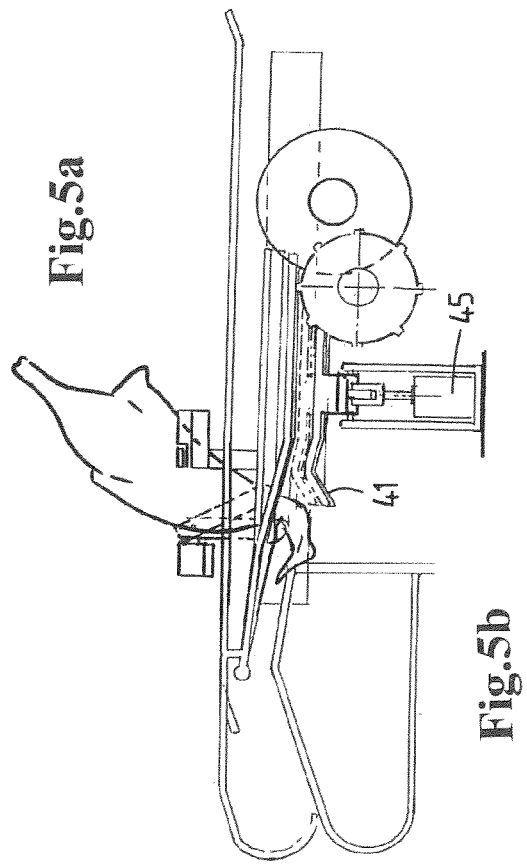
Figure 5C:
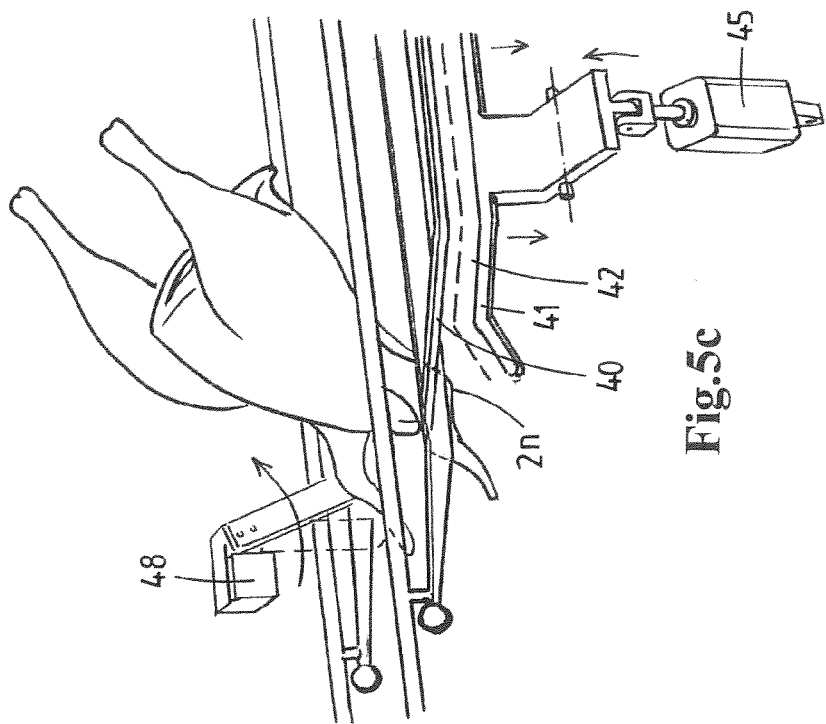
Figure 8C:
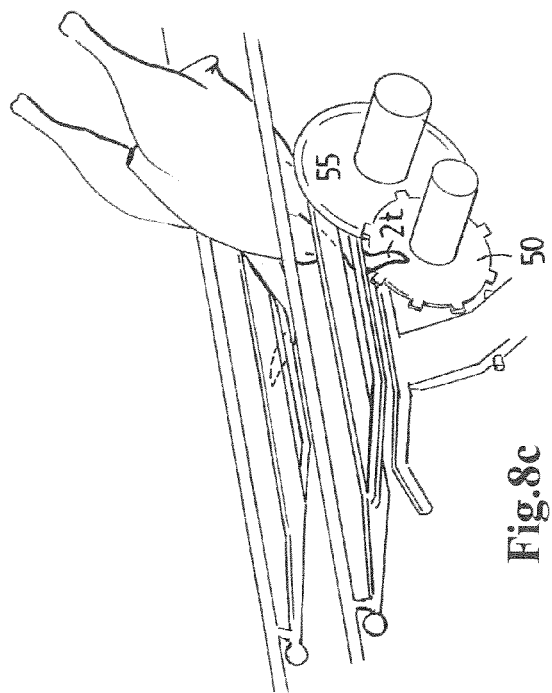
FIGS. 8a-8d: show part of the wing tip processing station shown in FIG. 2, illustrating the support of the wing tip segment by a support device, in plan view (FIG. 8a), side view (FIG. 8b), perspective view (FIG. 8c), and a detailed perspective view (FIG. 8d)
Figure 8D:
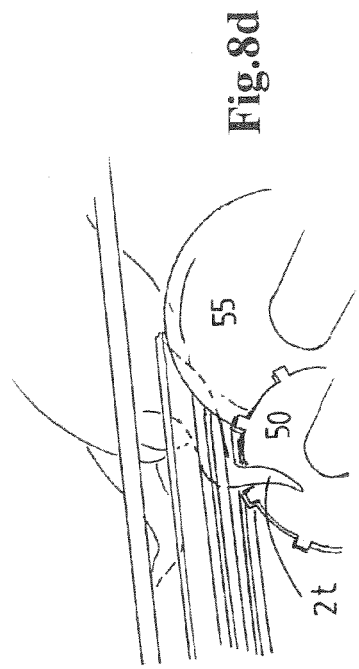
Figure 8A:
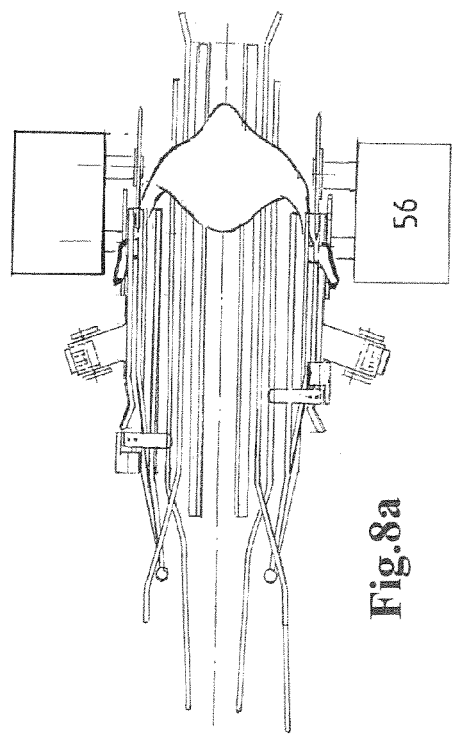
Figure 8B:
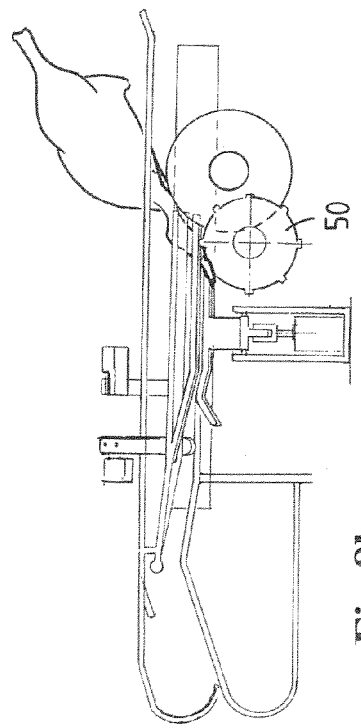

In the situation shown in FIG. 5, the conveyance of the body part 2a triggers a first activator 48, which activates the actuator 45 of the guide member 41 of the lower wing member guide to an open entry position, visible in particular in FIGS. 5b and 5c. In dotted lines the original, closed engagement position is visible. Retracting the lower wing member guide 41 to the open entry position enables an engagement of the lower wing member guide 41 and the lower wing member adjacent the elbow joint 2n, which is positioned adjacent the upper wing member guide 20. As such, the lower wing member 41 can accurately engage the lower wing member 2d, without the elbow joint 2n obstructing the conveyance.

In FIG. 6, a second activator 49 is visible, which is triggered by further conveyance of the body part 2a. This activator 49 activates the actuator 45 of the guide member 41 of the lower wing member guide to the closed engagement position, visible in particular in FIGS. 6b, 6c and 6d, in which the guide members 40, 41 clampingly engage the lower wing member 2d.

In the closed engagement position, as also visible in FIG. 7, the lower wing member 2d is clampingly engaged by the lower wing member guides 40 and 41. As lower wing member guide 41 in the shown engagement position is biased towards the other lower wing member guide 40, a clamping engagement is achieved, forcing the lower wing member 2d with the radius 2m' and ulna bone 2m" being positioned one behind the other, seen in the conveying direction, thereby defining the orientation of the lower wing member.

In addition, in FIG. 7a in particular it is visible that a portion of the lower wing member guide 40, 41 between the lower wing member entry location and the wing tip cutter is provided at an angle with the conveyor path 32, such that the lower wing member guide 40, 41 flares outwards with respect to the conveyor path 32 seen in the direction of conveyance 34. Thus, during conveyance of the carcass, the lower wing member 2d is folded away from the upper wing member 2c. In the shown embodiment, the lower wing member guides 40, 41 engage the lower wing member 2d close to the elbow joint 2n, and subsequently move along the lower wing member, thereby folding the lower wing member 2d open with respect to the upper wing member 2c, to a position in which the lower wing member guides 40, 41 engage the lower wing member 2d close to the wing tip joint 2j. In the shown embodiment, the situation wherein the radius and ulna bones are positioned one behind the other is achieved when the lower wing member guides are close to the wing tip joint 2j.

In the detailed figures of FIGS. 7d and 7e the situations are schematically indicated wherein wherein the radius and ulna bones are positioned one behind the other with intact bones (FIG. 7d) and broken bones (FIG. 7e). Because of the splinting operation of the lower wing member guides 40, 41, the device and method according to the present invention are particularly advantageous for handling wings having one or more broken bones.

In FIG. 8 a support device 50 is visible, for supporting the wing tip segment 2t in the vicinity of the wing tip cutter 55, opposite the side of the wing tip cutter 55 where the lower wing member 2d is engaged by the lower wing member guide. This is in particular visible in the plan view of FIGS. 8a, 9a and 9d. The support device is embodied as a rotatable support wheel, comprising indentations and protrusions for taking along and supporting the wing tip 2t, while the lower member 2d is supported by the lower wing support. As such, the wing tip joint 2j is accurately positioned in front of the wing tip cutter 55, and in addition, both the wing tip 2t and the lower wing member 2d are well supported during cutting.

The wing tip cutter 55 is embodied as a rotatable disc, driven by a drive motor 56. In FIG. 9 the removal of the wing tip segment is shown, in particular indicated in FIG. 9b by arrow R.

Figure 10:
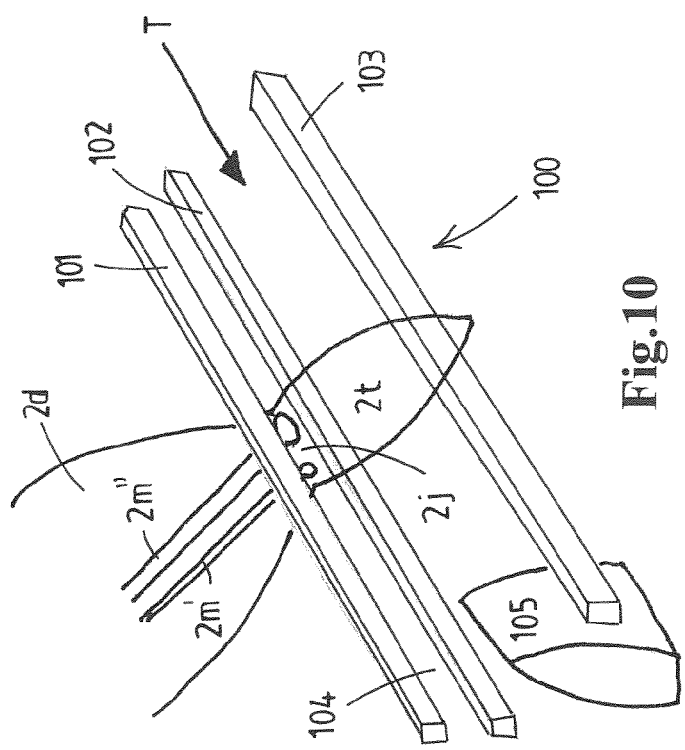
FIG. 10: shows part of an alternative wing tip processing station according to the invention in perspective view, illustrating the support of the wing tip segment by a support device, towards a wing tip cutter.

In FIG. 10 a portion of an alternative wing tip processing station 100 according to the invention is shown, at the location of the wing tip cutter 105. In this embodiment, the wing tip cutter 105 is embodied as a longitudinal knife. Not shown is a body and a carrier, but this may be similar to the embodiments of FIGS. 1-9. The conveying direction is schematically indicated with arrow T. The upper wing member and an upper wing member guide are also not visible, and may also be embodied similar to the embodiments of FIGS. 1-9. In FIG. 10, a lower wing member guide comprising two guide members 101 and 102 is visible. The guide members 101 and 102 define a slit 104 between them, in which the lower wing member 2d is received. According to the invention, one of the guide members is biased towards the other (not shown), such that the situation as shown in FIG. 10 can be arrived: the lower wing member 2d is clampingly engaged with the radius 2m' and ulna bone 2m" being positioned behind the other, seen in the conveying direction T. In FIG. 10, this engagement occurs close to the wing tip joint 2j, but alternatively it is also conceivable that the engagement occurs at a distance from the wing tip joint 2j. The advantage of the invention, visible in this FIG. 10, is that not only the position of the lower wing member 2d and the wing tip 2t is known, but also the orientation of the lower wing member 2d and thus of the wing tip joint 2j is defined.

According to a preferred embodiment of the invention, in FIG. 10 also a support device 103 is provided at the wing tip processing station 100. The support device 103 is here embodied as a rod, similar to the lower wing member guide. The support device 103 supports the wing tip segment 2t in the vicinity of the wing tip cutter 105, opposite the side of the wing tip cutter 105 where the lower wing member 2d is engaged by the lower wing member guide 101, 102.

Figure 11:
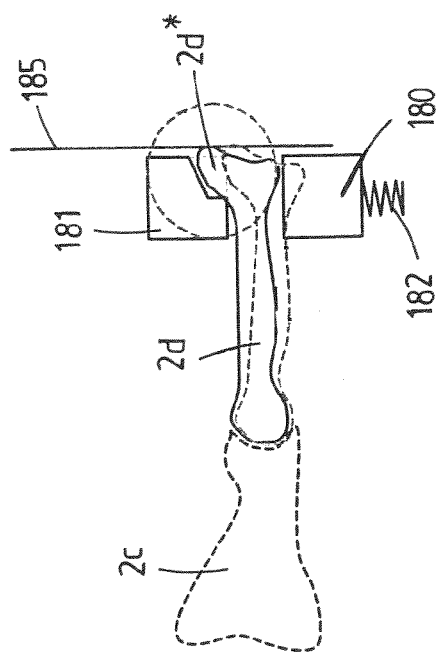
FIG. 11: shows a schematical side view of the bones of a wing at the location of the wing tip cutter.

In FIG. 11 the bones of the upper wing member 2c and the lower wing member 2d are schematically shown. At the end of the lower wing member 2d a natural protrusion 2d* of the bones is visible, which can also be discerned at the wing tip joint end of the anatomical drawing of FIG. 1b. According to the invention, two guide members 180, 181 are provided, defining a slit between them in which the lower wing member 2d is received. The lower guide member 180 is biased towards the other, allowing for variations of the width of the slit, here with the aid of a spring 182. In the shown embodiment, a recess is visible in the upper guide member 181, in which the natural protrusion 2d* of the lower wing member is received. This is advantageous as the wing tip cutter 185 can be positioned adjacent the lower wing member guide, without risking a cut into the radius and ulna bones. Such a cut into the radius and/or ulna bone has an enhanced risk of bone fragments being lodged into the meat.

In dotted lines, an 'original' situation of the lower wing member 2d is visible, which is forced into the orientation shown in straight lines. In the situation shown in FIG. 11, at the wing tip cutter 185, the clamping engagement of the guide members 180, 181 onto the lower wing member 2d, with the radius and ulna bones being positioned one behind the other, seen in the conveying direction, is located close to the wing tip joint, opposite from the wing tip segment, thereby defining the orientation of the lower wing member 2d and of the wing tip segment (not shown). It is visible that in this embodiment the wing tip cutter 185 is provided perpendicular to the lower wing member, and perpendicular to the direction of conveyance.

The invention claimed is:

1. Device for removing wing tips from carcass parts of slaughtered poultry, in which a carcass part comprises at least part of a rib cage and at least one wing, the wing comprising:
   an upper wing member with the humerus bone, extending between the shoulder and the elbow joint;
   a lower wing member with the radius and ulna bones, extending between the elbow joint and the wing tip joint,
   a wing tip segment comprising wing tip bones, which is connected via the wing tip joint to the lower wing member,
which device comprises:
   a conveyor comprising a conveyor path and at least one carrier which is adapted to carry a carcass part, along which conveyor path the at least one carrier is movable in a conveying direction,
   a wing tip processing station which is disposed along the conveyor path and to which a carcass part is fed by the conveyor, in which wing tip processing station the carcass part is processed while the carcass part is being carried by the carrier, wherein the wing tip processing station comprises a wing tip cutter adapted to remove the wing tip segment from the lower wing member,
   a set of multiple wing guides for guiding and positioning one wing so as to define the position of the lower wing member, the wing tip joint and the wing tip of said one wing at the wing tip cutter, the set of wing guides comprising:
      at least one upper wing member guide, which is adapted to catch and guide the upper wing member at least between an upstream upper wing member entry location and the wing tip cutter downstream of said upper wing member entry location;
      at least one lower wing member guide, which is adapted to catch and guide the lower wing member at least between a lower wing member entry location and the wing tip cutter downstream of said lower wing member entry location, wherein the lower wing member entry location is downstream of the upper wing member entry location;
characterized in that the lower wing member guide comprises two guide members defining a slit between them in which the lower wing member is received, wherein at least one of the guide members is biased towards the other guide member, allowing for variations of the width of the slit, such that—at the wing tip cutter—the guide members clampingly engage the lower wing member with the radius and ulna bones being positioned one behind the other, seen in the conveying direction, thereby defining the orientation of the lower wing member and of the wing tip segment at the wing tip cutter.

2. Device according to claim 1, wherein the guide members of the lower wing member guide clampingly engage the lower wing member with the radius and ulna bones being positioned one behind the other, seen in the conveying direction, close to the wing tip joint.

3. Device according to claim 1, wherein the guide member being biased towards the other guide member is movably supported by an actuator or by a spring.

4. Device according to claim 3, wherein the guide member being biased towards the other guide member is movably supported by an actuator adapted to adjust the bias of the guide member being biased towards the other guide member.

5. Device according to claim 4, wherein the actuator is adapted to cause an additional movement of the guide member being biased towards the other guide member, between an open entry position and an engagement position, wherein in the open entry position the slit has an increased width enhancing the entry of the lower wing member in the slit between the guide members, and wherein in the engagement position the guide members clampingly engage onto the lower wing member.

6. Device according to claim 3, wherein the guide member being biased towards the other guide member is movably supported by an actuator and wherein the actuator is a hydraulic or pneumatic device.

7. Device according to claim 1, wherein the upper wing member guide extends along the conveyor path from the upper wing member entry location, via the wing tip cutter to a further downstream location.

8. Device according to claim 1, wherein a portion of the upper wing member guide between the upper wing member entry location and an elbow defining position is provided at an angle with the conveyor path, such that the upper wing member guide flares outwards with respect to the conveyor path seen in the direction of conveyance.

9. Device according to claim 8, wherein the lower wing member entry location is provided in the vicinity of the elbow defining position, adjacent the upper wing member guide.

10. Device according to claim 1, wherein a portion of the lower wing member guide between the lower wing member entry location and the wing tip cutter is provided at an angle with the conveyor path, such that the lower wing member guide flares outwards with respect to the conveyor path seen in the direction of conveyance.

11. Device according to claim 1, wherein the at least one carrier is adapted to carry a carcass part in a hanging orientation.

12. Device according to claim 11, wherein the at least one carrier is adapted to carry a carcass part in a hanging orientation with the back side of the carcass part leading as seen in the conveying direction.

13. Device according to claim 1, wherein a support device is provided at the wing tip processing station, for supporting the wing tip segment in the vicinity of the wing tip cutter, wherein the support device is located on a side of the wing tip cutter opposite the side of the wing tip cutter where the lower wing member is engaged by the lower wing member guide.

14. Method for removing wing tips of slaughtered poultry with the device according to claim 1, in which a carcass part comprises at least one wing, the wing comprising:
   an upper wing member with the humerus bone, extending between the shoulder and the elbow joint;
   a lower wing member with the radius and ulna bones, extending between the elbow joint and the wing tip joint,
   a wing tip segment comprising wing tip bones, which is connected via the wing tip joint to the lower wing member,
wherein the method comprises:
   conveying a carcass part in the conveying direction;
   the upper wing member entering the upper wing member guide at the upper wing member entry location;
   receiving the lower wing member in the slit defined by the two guide members of the lower wing member guide at the lower wing member entry location;
   conveying the lower wing member along the lower wing member guides, thereby positioning the lower wing member;
   biasing at least one of the guide members of the lower wing member guide causing a clamping engagement of the guide members onto the lower wing member, at the wing tip cutter—the guide members of the lower wing member guide clampingly engaging the lower wing member with the radius and ulna bones being positioned one behind the other, seen in the conveying direction, thereby defining the orientation of the lower wing member;

removing the wing tip segment from the lower wing member by the wing tip cutter.

15. Method according to claim 14, wherein conveying the carcass part in the conveying direction comprises conveying the carcass part in the conveying direction with the back side of the carcass part leading.

* * * * *